United States Patent [19]

Brenner

[11] Patent Number: 5,893,710

[45] Date of Patent: Apr. 13, 1999

[54] FUEL-OPERATED HEATER, ESPECIALLY AN AUXILIARY HEATER FOR A MOTOR VEHICLE

[75] Inventor: Dirk Brenner, Stuttgart, Germany

[73] Assignee: J. Eberspächer GmbH & Co., Esslingen, Germany

[21] Appl. No.: 08/769,107

[22] Filed: Dec. 18, 1996

[30] Foreign Application Priority Data

Dec. 22, 1995 [DE] Germany .................. 195 48 226

[51] Int. Cl.⁶ .................................................. F24H 1/00

[52] U.S. Cl. ................................... 432/222; 123/435

[58] Field of Search ............................ 432/222, 223; 431/12, 18, 75, 89, 90; 123/435

[56] References Cited

U.S. PATENT DOCUMENTS

| | | | |
|---|---|---|---|
| 4,568,266 | 2/1986 | Bonne | 432/12 |
| 4,724,812 | 2/1988 | Akagi | 123/435 |
| 5,065,579 | 11/1991 | Monahan | 60/524 |
| 5,456,408 | 10/1995 | Appel | 237/2 A |

*Primary Examiner*—Teresa J. Walberg
*Assistant Examiner*—Gregory Wilson
*Attorney, Agent, or Firm*—McGlew and Tuttle

[57] ABSTRACT

A fuel-operated heater, especially an auxiliary heater for a motor vehicle, with a fuel feed pump and/or with a combustion air fan, is provided with a combustion control circuit. The control circuit acts to maintain a predetermined air-to-fuel ratio at a constant value in the combustion chamber of the heater ("lambda value") by energizing the controllable fuel feed pump and/or the controllable combustion air fan.

19 Claims, 2 Drawing Sheets

FUEL-OPERATED HEATER, ESPECIALLY AN AUXILIARY HEATER FOR A MOTOR VEHICLE

FIELD OF THE INVENTION

The present invention pertains to a fuel-operated heater, especially an auxiliary heater for a motor vehicle, with a fuel feed pump and/or a combustion air fan.

BACKGROUND OF THE INVENTION

In prior-art, fuel-operated heater, the combustion of fuel, usually gasoline or diesel fuel, takes place in the combustion chamber under air excess. This means that oxygen is still present in the waste gas and stoichiometrically complete combustion does not take place. The range of operation of the combustion chamber covers, in terms of combustion engineering, a lambda range (possible air-to-fuel ratios within the range of operation). To ensure the operation of the device in this range, the amount of combustion air is set during the installation of a prior-art heater or of the fan by means of a variable bypass opening, or the amount of fuel is set in the case of a fuel feed pump by means of an adjusting screw. This requires a high design effort for the heater and long adjusting times.

The above-mentioned range of operation may be left during the operation of a heater for the following reasons:

Clogging of the combustion air intake or of the waste gas outlet, as a result of which the amount of combustion air is reduced.

Clogging of a heat exchanger connected to the heater by combustion residues, as a result of which the amount of combustion air is also reduced during the operation.

Change in the mass flow of combustion air during the operation of the heater at different altitudes above mean sea level.

If the range of operation or lambda range is left, the combustion values deteriorate. The heater no longer operates satisfactorily and it may fail.

SUMMARY AND OBJECTS OF THE INVENTION

The primary object of the present invention is to provide a fuel-operated heater of the type described in the introduction, which has a simple design yet can be operated effectively and reliably and in an environmentally friendly manner and with good combustion values under any operating conditions.

According to the invention, a fuel-operated heater, especially an auxiliary heater for a motor vehicle, is provided with fuel feed means (for example a pump, fuel timing valve, etc.) and/or a combustion air fan. The heater has a combustion control circuit, by which a preset air-to-fuel ratio ($\lambda_0$) can be maintained at a constant value in the combustion chamber of the heater by energizing the controllable fuel feed pump and/or energizing the, controllable combustion air fan.

The heater preferably provides a measuring sensor in the combustion chamber which determines the current lambda value and by which the fuel feed pump and/or the combustion air fan can be energized via a controller. The measuring sensor is preferably one of a temperature sensor, a lambda sensor (air to fuel ratio), or a light sensors.

The combustion control circuit is preferably put out of operation at the time of the start of the heater and can be switched on during the operation of the heater. The controller is preferably designed as a controller integrated in the control device of the heater. The fuel feed pump or the combustion air fan preferably can be adjusted manually and the other part, the combustion air fan or the fuel feed pump, can be energized via the combustion control circuit, i.e., the amount of combustion air fed to the heater or the amount of fuel fed to the heater can be automatically adjusted. The temperature sensor is preferably arranged axially in the combustion chamber of the heater.

The temperature sensor is preferably arranged in the area of a flame diaphragm, wherein the tip of the temperature sensor is arranged downstream of the flame diaphragm.

The essence of the present invention is to provide a fuel-operated heater (e.g., an auxiliary heater for a motor vehicle, an engine-independent parking heater for a motor vehicle, but also a burner for soot filter units, boilers, etc.) with a combustion control circuit, by which a predetermined air-to-fuel ratio can be maintained at a constant value in the combustion chamber of the heater ("lambda value") by energizing the controllable fuel feed pump and/or the controllable combustion air fan.

The heater advantageously has a measuring sensor in the combustion chamber, which determines the current lambda value and by which the fuel feed pump and/or the combustion air fan can be energized via a controller, wherein the controller may optionally be designed as a controller integrated in the control device of the heater. The measuring sensor determines the instantaneous lambda value. The controller compares this lambda value with the desired value (command variable) and energizes the combustion air fan and/or the fuel feed pump according to an established control law. If the measured lambda value deviates from the desired value, a correction is performed.

Instead of the fuel feed pump, the heater may also have a timing valve. It is apparent that the timing valve is energized in this case if desired. The variant with the timing valve is within the scope of the claimed protection of the present invention.

The heater can be started unaffected by the control. The control can start to function only during steady, continuous combustion. The heating output can thus be controlled in a simple manner.

An especially simply designed arrangement of a heater with combustion control is obtained if the fuel feed pump or the combustion air fan can be adjusted manually and the other part, namely, the combustion air fan or the fuel feed pump, can be energized via the combustion control circuit, i.e., the amount of combustion air fed to the heater can be automatically adjusted or the amount of fuel fed to the heater can be automatically reduced.

The measuring sensor may preferably be a temperature sensor, a lambda sensor, or a light sensor. However, other sensors, which are suitable for determining lambda, are conceivable as well.

If a temperature sensor is provided, this is preferably arranged axially in the combustion chamber, especially in the area of a flame diaphragm, with the top of the temperature sensor being located behind the flame diaphragm. A temperature sensor determines the flame temperature, from which the lambda value can be directly inferred corresponding to a characteristic peculiar to the temperature sensor. A temperature sensor may, in principle, also be used for flame recognition.

A lambda sensor has a design similar to that of the lean mix probes in passenger cars.

A light sensor measures the luminous power of the flame, which increases with increasing percentage of soot (difference between blue burner and yellow burner) in the flame.

The following advantages are achieved by the present invention:

1. The complicated adjusting process during the manufacture of the heater is avoided.
2. There is no need for a bypass.
3. The heater operates reliably over its service life even with increasing contamination of the heat exchanger.
4. The range of operation (lambda range) of the combustion chamber can be narrow (low expense for development), unlike in prior-art designs.
5. Unlike in prior-art designs, the adjustment of the fuel feed pump may be, allowed to be inaccurate (simple manufacture).
6. The good combustion values obtained in each case of operation, especially at different altitudes above sea level, make it possible to obtain an exhaust gas with low pollutant level and to comply with even stricter legal requirements that may be imposed in the future, because the actual combustion can be brought close to the optimal combustion.

The present invention will be described in greater detail below on the basis of exemplary embodiments with reference to the attached drawing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
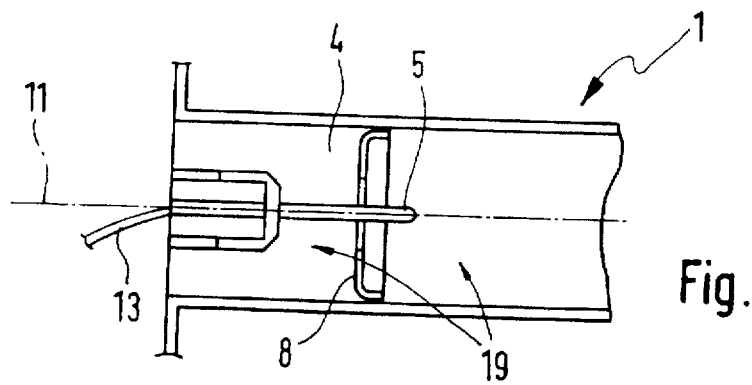
FIG. 1 is a schematic axial sectional view of a fuel-operated heater during the operation of the combustion chamber.

Referring to the drawings in particular, the invention comprises a fuel-operated heater 1 including a fuel feed pump 2 and a combustion air fan 3.

A measuring sensor 5 in the form of a temperature sensor, which is fastened centrally in the combustion chamber 4 on the inlet side of the fuel 16 and of the combustion air 15, is located in the combustion chamber 4 of the heater 1 in the longitudinal extension. The temperature sensor 5 extends through a central opening of a flame diaphragm 8. The tip of the temperature sensor is located essentially in the center of the flame 19 of the heater 1 during operation.

Figure 2:
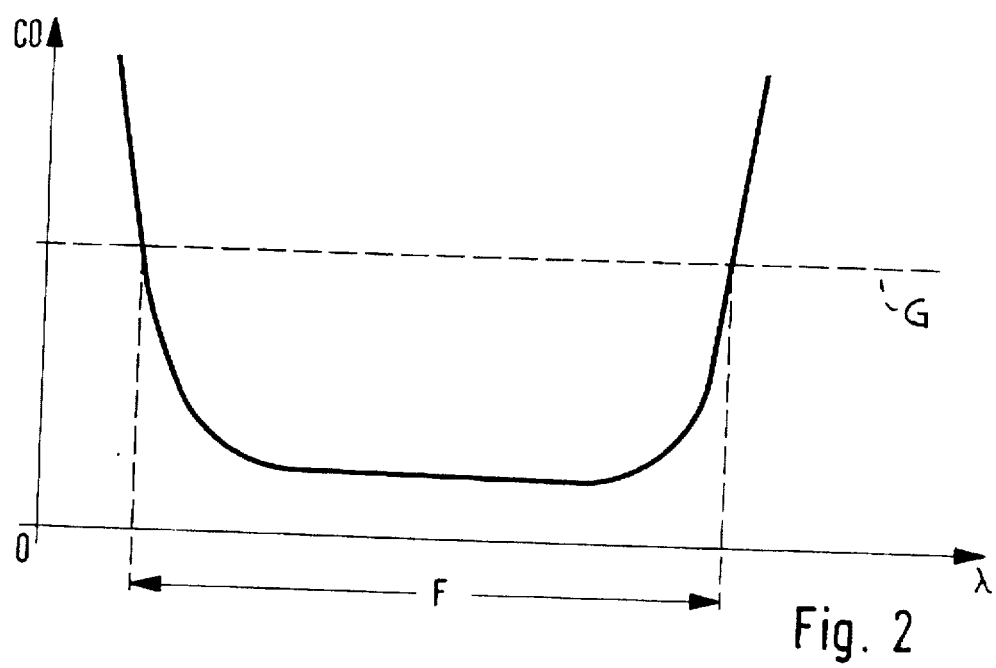
FIG. 2 is a schematic range of operation of the combustion chamber according to FIG. 1 as a function of the pollutant discharge.

The combustion chamber 4 of the heater 1 is operated in a combustion engineering range of operation F of an acceptable air-to-fuel ratio, as is shown, e.g., in FIG. 2. The limit G represents the maximum allowable pollutant emission in the form of CO and soot of the combustion. The range of operation, also called lambda range, defines too rich a combustion and too lean a combustion to the left and right of the range of operation F, respectively, at which the soot and carbon monoxide contents in the waste gas typically increase abruptly. If the limit values are exceeded in, e.g., vehicle heaters, the device is damaged or at least impaired.

The range of operation F or the lambda range may be left during the operation of the heater in the vehicle for various reasons, e.g., during the operation of the heater 1 at a high altitude above mean sea level. The low air density at such a great altitude, e.g., at an altitude of 2,000 m in mountains, may possibly cause a shift of the current lambda value to outside the range of operation F according to FIG. 2 to the left: Combustion becomes too rich because of the amount of air being fed in becoming too small.

Provisions are now made to always operate the heater 1 at the same lambda value set via a combustion control circuit 10 by energizing the combustion air fan 3 and/or the fuel feed pump 2.

Figure 3:
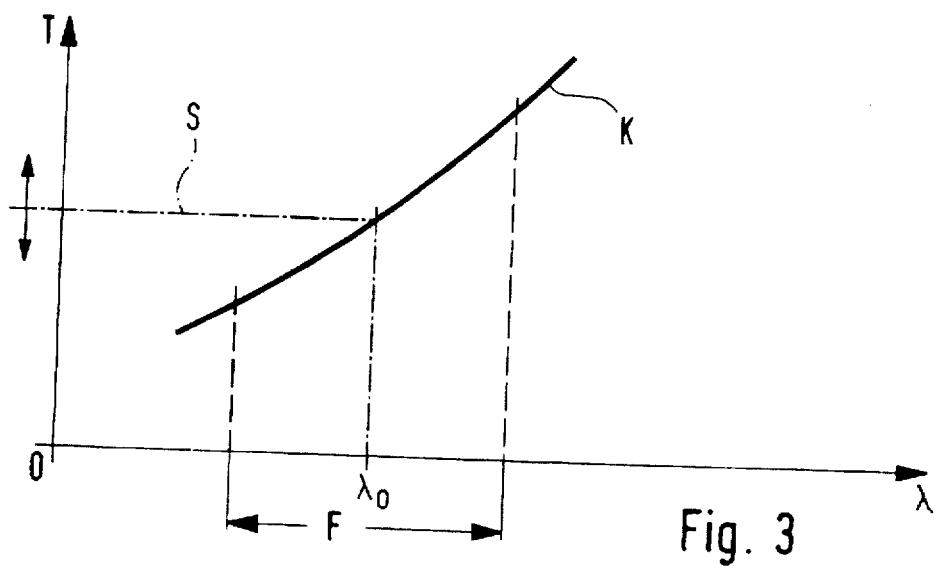
FIG. 3 is a schematic range of operation of the combustion chamber according to FIG. 1 as a function of the temperature of an individual temperature sensor with a corresponding characteristic K.

This is done in the exemplary embodiment shown in the drawing by means of the above-mentioned temperature sensor 5, which is arranged in the combustion chamber 4. The sensor 5 determines the current flame temperature, from which the lambda value can be directly inferred according to FIG. 3. For example, the characteristic K is assigned to the temperature sensor shown.

The combustion is now controlled in the heater such that a (flame) temperature T which corresponds to the desired value S of the underlying lambda value ($\lambda_o$), which is to be maintained at a constant value, is always maintained in the combustion chamber.

Figure 4:
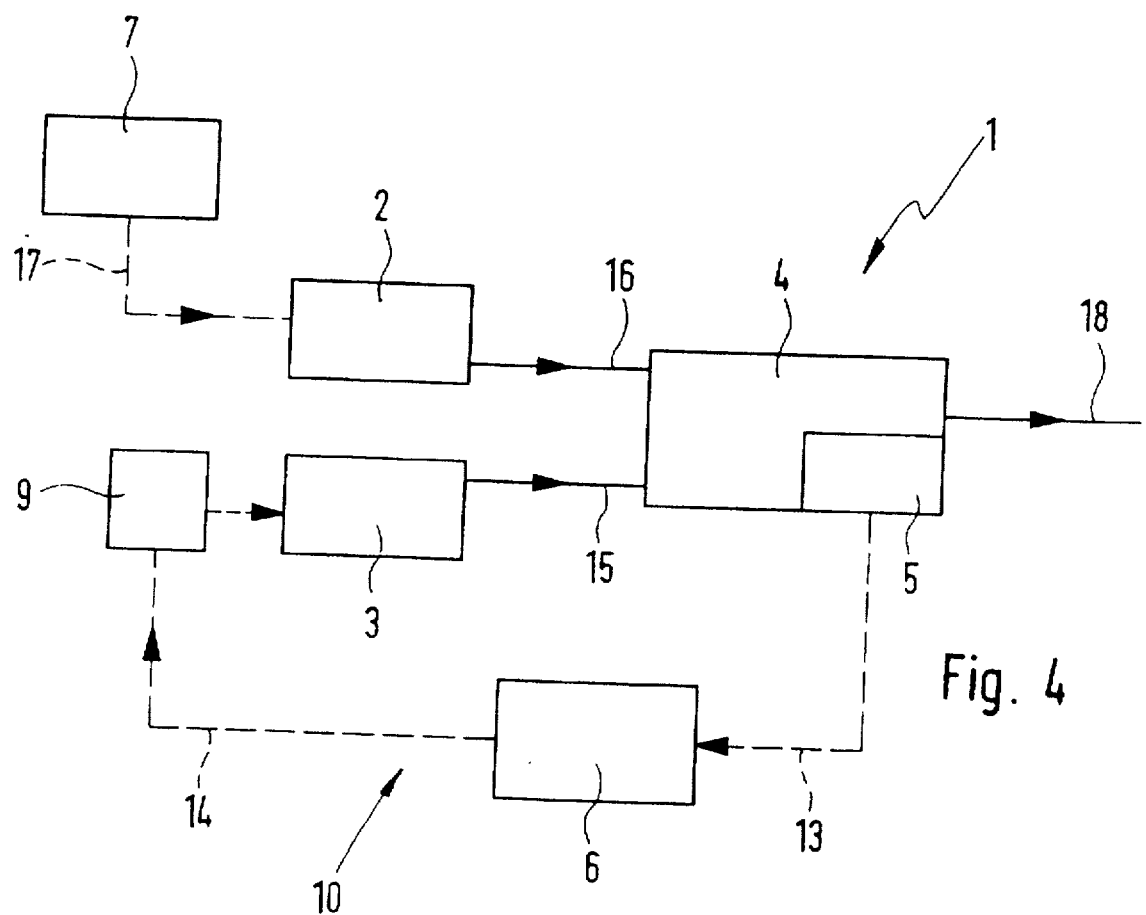
FIG. 4 is a schematic combustion control circuit of a fuel-operated heater with the combustion air volume flow as the controlled variable.

A variant of the combustion control circuit 10, which provides for the combustion air volume flow as the controlled variable, is shown in FIG. 4. The signal flows are shown by broken line and the mass flows by solid line in FIG. 4. During operation, a heating output control device 7 sends a control signal 17 to the fuel feed pump 2. Corresponding to the pump frequency set, fuel 16 is made available to the combustion chamber 4 of the heater.

Combustion air 15 is fed at the same time to the combustion chamber 4 via a combustion air fan 3 driven by an electric motor 9. The fuel-air mixture burns in the combustion chamber, and the waste gas 18 is removed from the combustion chamber. The temperature sensor "measures" the quality of combustion in the combustion chamber 4 by determining the current flame temperature.

If the flame temperature T deviates from the desired value S, the measuring sensor 5 sends a control signal 13 to a controller 6. The controller 6 compares this current value with the desired value (command variable) and controls the electric motor 9, which is in drive connection with the controllable combustion air fan 3, via the control signal 14 (manipulated variable/voltage) according to an established control law. Consequently, if the flame temperature determined or the lambda value determined, deviates from the desired value, correction is performed: The combustion air is automatically adjusted according to FIG. 4, depending on what amount of fuel 16 has just been set by means of the heating output control device 7 of the fuel feed pump 2 and/or whether this is required by the current situation of a heater, e.g., when less combustion air 15 is fed to the combustion chamber 4, despite the fact that the control signal 17 of the combustion chamber 4 has been maintained at a constant value, because of the fact that the heater 1 happens to be located at a high altitude or clogging of the combustion air intake or of the waste gas outlet has taken place.

Figure 5:
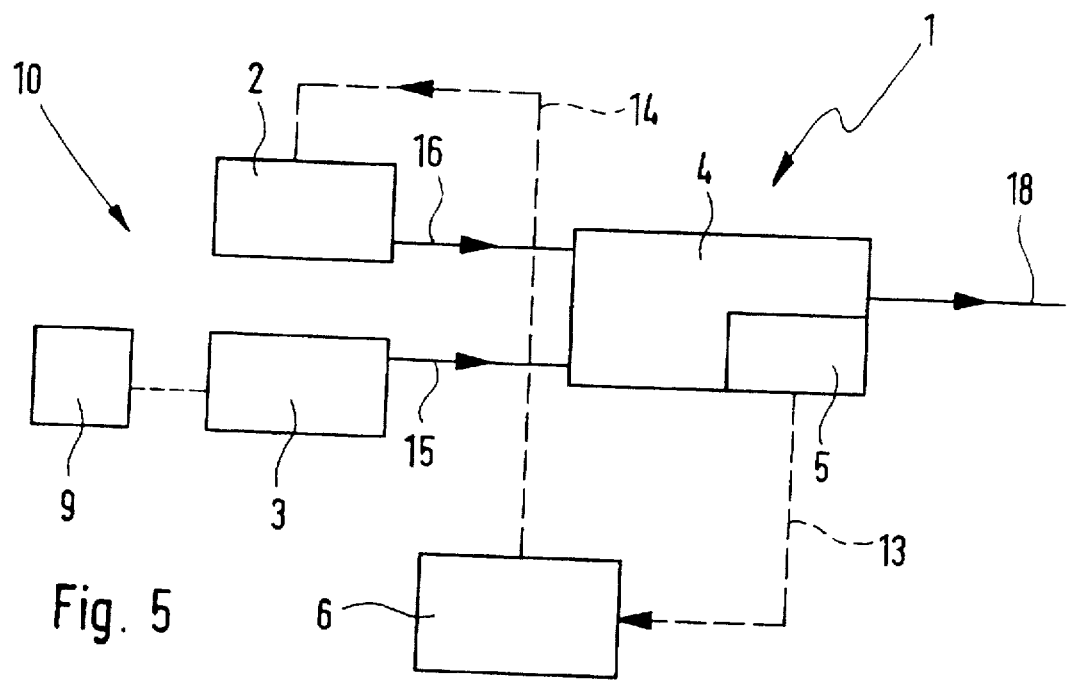
FIG. 5 is a schematic combustion control circuit similar to that shown in FIG. 4 with the fuel volume flow as the controlled variable.

Another variant of a combustion control circuit 10, in which the fuel volume flow of the fuel feed pump is provided as the controlled variable, is illustrated in FIG. 5. The manipulated variable 14 controls here the frequency of the fuel feed pump 2 rather than the fan 3, as in the above-described exemplary embodiment. The control circuit otherwise corresponds essentially to the variant according to FIG. 4, and the electric motor 9 can be set to different operating levels by manual operation. The fuel feed pump 2 may also be associated with an automatic or manually adjustable heating output control unit 7, as in the case of the variant according to FIG. 4.

While a specific embodiment of the invention has been shown and described in detail to illustrate the application of the principles of the invention, it will be understood that the invention may be embodied otherwise without departing from such principles.

What is claimed is:

1. A fuel-operated heater, comprising:
   a combustion chamber;
   a fuel feed pump;
   a fan with an associated fan drive;
   a sensor provided in said combustion chamber of the heated, said sensor being one of a temperature sensor providing a control signal indicating a flame temperature in said combustion chamber or a light sensor providing a control signal indicating a luminous power of a combustion flame;
   air to fuel ratio adjusting means for adjusting an air to fuel ratio including at least one of a fuel supply adjusting means for adjusting the fuel supplied to the heater by said fuel feed pump and a combustion air fan adjusting means for adjusting combustion air volume flow;
   a combustion control circuit, for maintaining a preset air-to-fuel ratio ($\lambda_o$) at a constant value in said combustion chamber of the heater by energizing said air to fuel ratio adjusting means, said combustion control circuit energizing said air to fuel ratio adjusting means based on said control signal and a predetermined correspondence for the combustion chamber between flame temperature and air to fuel ratio for the control signal indicating a flame temperature or a predetermined correspondence for the combustion chamber between luminous power of the flame and air to fuel ratio for a control sisal indicating a luminous power of the combustion flame.

2. A heater in accordance with claim 1, wherein said combustion control circuit is deactivated at a time of a start of the heater and can be switched on during operation of the heater.

3. A heater in accordance with claim 1 wherein said combustion control circuit is integrated in a control device of the heater.

4. A heater in accordance with claim 1, wherein one of said fuel supply adjusting means and said combustion air fan adjusting means can be adjusted manually and the other of said fuel supply adjusting means and said combustion air fan adjusting means can be energized via said combustion control circuit, whereby an amount of combustion air fed to the heater or an amount of fuel fed to the heater can be automatically adjusted.

5. A heater in accordance with one of the claim 1, wherein said temperature sensor is arranged axially in a combustion chamber of the heater.

6. A heater in accordance with claim 1, further comprising a flame diaphragm, wherein said temperature sensor is arranged in an area of said flame diaphragm, wherein a tip of the temperature sensor is arranged downstream of said flame diaphragm.

7. A heater in accordance with claim 1, wherein said fuel supply means is a fuel pump.

8. A fuel-operated heater, comprising:
   a combustion chamber;
   an adjustable fuel feed pump;
   a fan with an associated adjustable fan drive;
   a sensor provided in said combustion chamber of the heater, said sensor being one of a temperature sensor providing a control signal indicating a flame temperature in said combustion chamber or a light sensor providing a control signal indicating a luminous power of a combustion flame;
   a combustion control circuit, for maintaining a preset air-to-fuel ratio ($\lambda_o$) at a constant value in said combustion chamber of the heater by controlling at least one of said adjustable fuel feed pump and said fan with an associated adjustable fan drive based on said control signal and a predetermined correspondence for the combustion chamber between flame temperature and air to fuel ratio for the control signal indicating a flame temperature or a predetermined correspondence for the combustion chamber between luminous power of the flame and air to fuel ratio for a control signal indicating a luminous power of the combustion flame.

9. The heater in accordance with one of the claim 8, wherein said combustion control circuit is deactivated at a time of a start of the heater and can be switched on during operation of the heater.

10. The heater in accordance with claim 8 wherein said combustion control circuit is integrated in a control device of the heater.

11. The heater in accordance with claim 8, wherein one of said adjustable fuel feed pump and said fan with an associated adjustable fan drive is energized via said combustion control circuit, whereby an amount of combustion air fed to the heater or an amount of fuel fed to the heater is automatically adjusted based on a temperature sensed by said temperature sensor.

12. The heater in accordance with one of the claim 8, wherein said temperature sensor is arranged axially in a combustion chamber of the heater.

13. A heater in accordance with claim 8, further comprising a flame diaphragm, wherein said temperature sensor is arranged in an area of said flame diaphragm, wherein a tip of the temperature sensor is arranged downstream of said flame diaphragm.

14. A fuel-operated heater, comprising:
   a combustion chamber;
   an adjustable fuel feed pump;
   a fan with an associated adjustable fan drive;
   a sensor provided in said combustion chamber of the heater, said sensor being one of a temperature sensor providing a control signal indicating a flame temperature in said combustion chamber or a light sensor providing a control signal indicating a luminous power of a combustion flame;

a combustion control circuit, for maintaining a desired air-to-fuel ratio ($\lambda_o$) at a constant value in said combustion chamber of the heater by controlling at least one of said adjustable fuel feed pump and said fan with an associated adjustable fan drive based on said control signal, said control signal providing an indication of an actual air-to-fuel ratio ($\lambda_o$) based on a predetermined correspondence for the combustion chamber between flame temperature and air to fuel ratio for the control signal indicating a flame temperature or a predetermined correspondence for the combustion chamber between luminous power of the flame and air to fuel ratio for a control signal indicating a luminous power of a combustion flame for adjusting said at least one of said adjustable fuel feed pump and said fan with an associated adjustable fan drive to said desired air-to-fuel ratio ($\lambda_o$).

15. The heater in accordance with one of the claim 14, wherein said combustion control circuit is deactivated at a time of a start of the heater and can be switched on during operation of the heater.

16. The heater in accordance with claim 14 wherein said combustion control circuit is integrated in a control device of the heater.

17. The heater in accordance with claim 14, wherein one of said adjustable fuel feed pump and said fan with an associated adjustable fan drive is energized via said combustion control circuit, whereby an amount of combustion air fed to the heater or an amount of fuel fed to the heater is automatically adjusted based on a temperature sensed by said temperature sensor.

18. The heater in accordance with one of the claim 14, wherein said temperature sensor is arranged axially in a combustion chamber of the heater.

19. A heater in accordance with claim 14, further comprising a flame diaphragm, wherein said temperature sensor is arranged in an area of said flame diaphragm, wherein a tip of the temperature sensor is arranged downstream of said flame diaphragm.

* * * * *